though a better understanding will be gained by a study of the drawings.

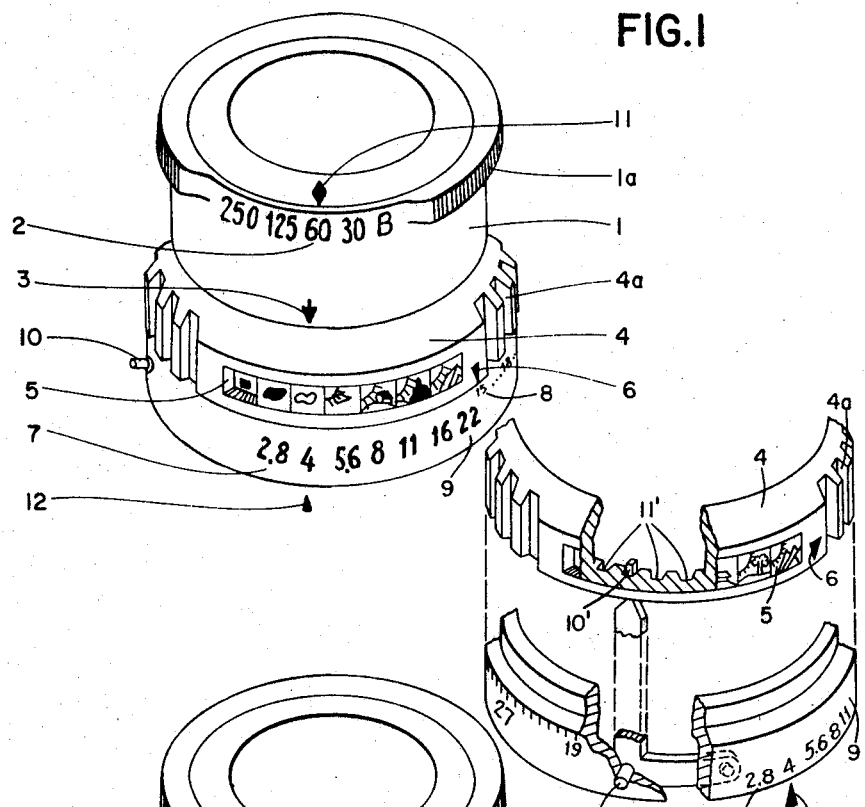
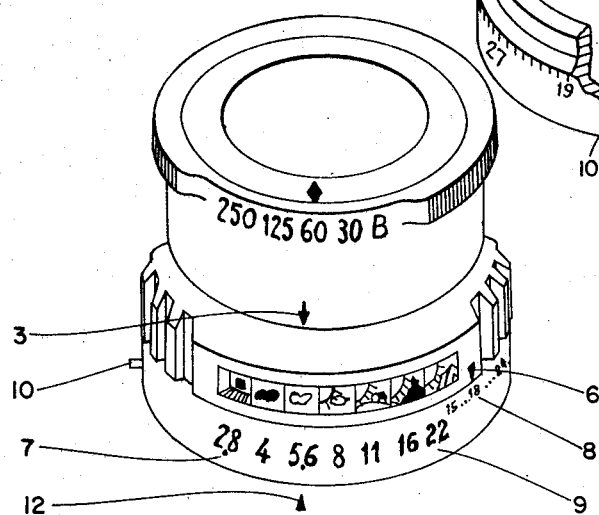

United States Patent Office 3,505,942
Patented Apr. 14, 1970

3,505,942
MANUALLY SET OBJECTIVE FOR A PHOTOGRAPHIC CAMERA
Wolfgang Ort, Stuttgart-Bad Cannstatt, Germany, assignor to Eastman Kodak Company, Rochester, N.Y., a corporation of New Jersey
Filed July 28, 1967, Ser. No. 656,862
Int. Cl. G03b 9/02
U.S. Cl. 95—64                6 Claims

ABSTRACT OF THE DISCLOSURE

An objective for a photographic camera in which the shutter speed setting member, the diaphragm aperture adjusting member and film speed setting member are interconnected for manual settings in relation to a scene brightness scale having visual symbols. When the film speed value is changed by moving the film speed setting members the scene brightness visual symbol changes automatically but the diaphragm aperture remains the same. Thereafter the scene brightness scale and diaphragm aperture bear a fixed relation to one another for any setting of the two relative to a fixed index and to the shutter speed setting member.

CROSS-REFERENCES TO RELATED APPLICATIONS

Reference is made to commonly assigned U.S. patent application Ser. No. 626,512, entitled "Objective for a Photographic Camera," filed Mar. 28, 1967 in the name of Wolfgang Ort.

The present invention relates to photographic cameras and more particularly to cameras having objectives with exposure factor adjusting members that may be coupled with each other.

It is known in the art to detachably interconnect diaphragm and shutter speed adjusting members according to existing light conditions as may be measured by an exposure meter. Conventionally, these members are provided with $f$ value and shutter speed number scales, respectively, but easily understood visual symbols also may be used.

In addition, simple cameras without built in exposure meters are known. These cameras often include a single fixed shutter speed and are adapted to be used with film of a specific type or speed, the diaphragm adjusting member being provided with a scale of illumination symbols corresponding in number to the $f$ stops available in the camera and serving to set the $f$ stop in accordance with scene brightness.

In the case of such simple camera structures, properly exposed pictures cannot be taken under extreme illumination conditions because of the limited number of available $f$ stops. Moreover, when there is to be used a type of film other than that for which the camera is designed, an erroneous exposure may result.

The present invention overcomes these disadvantages and, in addition, provides a simple camera structure enabling the photographer to cover an exposure range substantially wider than covered with prior art structures.

According to the invention, there is provided an adjusting member that defines illumination symbols known in the art. This adjusting member is coupled with a diaphragm control ring in locked positions corresponding to different film speed values. By further providing a shutter speed adjusting member coaxial with said adjusting member and carrying an index, the $f$ value most suitable for the particular pre-selected film speed is set automatically when the symbol corresponding to the specific scene brightness is aligned with the index by rotating the adjusting members relative to each other.

The invention as well as objects and advantages thereof will become more apparent from the following description and accompanying drawing in which:

FIG. 1 is a perspective view showing a preferred embodiment of the invention,

FIG. 2 is a second view showing the structure of FIG. 1, but with a different film speed setting, and FIG. 3 is an exploded segmental view of a portion of the objective of FIGS. 1 and 2.

Photographic cameras having adjustable objective assemblies generally are known, and in view of this, the present invention will be described only with reference to those elements directly related to a required understanding of the invention.

In FIG. 1 a shutter-objective assembly is shown with the front lens and the distance scale, if any, omitted for purposes of clarity. A shutter speed or exposure time adjusting member 1 is formed as a rotatable ring including a knurled portion 1a for controlling rotation of member 1 relative to the assembly. Arranged on the outer surface of shutter speed adjusting member 1 are a shutter speed scale 2 and a scene brightness index 3.

Coaxial with and partly overlapping adjusting member 1 is a film speed setting or adjusting member or ring 4 provided with a knurled portion 4a. Adjusting member 4 carries on part of its outer surface both a scale 5 of symbols, each corresponding to a visual scene brightness, and a film speed index 6.

A diaphragm adjusting or control ring 9 including an $f$ scale 7 and a film speed scale 8 is associated with film speed adjusting member 4. For rotation of ring 9 with adjusting member 4, diaphragm ring 9 may be coupled thereto in a known manner in locked positions corresponding to different film speed values. The coupling means, which may be a leaf spring 10' engaging a series of detent slots 11' as described in my copending application Ser. No. 626,512, filed Mar. 28, 1969, and Patent No. 3,447,441 is disengaged by depressing a control button 10 and re-engaged by releasing the button.

Finally, there is shown a fixed index 11 that is carried by the objective barrel and points to the shutter speed set, and a fixed index 12 that is arranged opposite diaphragm control ring 9 on a camera housing (not shown) to visually indicate the resulting $f$ stop.

Both the shutter ring 1 and diaphragm ring 9 control, respectively, setting of the shutter and diaphram mechanisms, per se, in a manner known in the art. Each of the rings are mounted for relative rotation coaxially by known structure.

Operation of the invention as shown in the preferred embodiment is as follows. Depending on the speed of the film used, button 10 is depressed, and index 6 carried on film speed adjusting member 4 is aligned with the particular film speed value on diaphragm control ring 9 (for example DIN 15 in FIG. 1). Button 10 then is released, and adjusting member 4 and diaphragm control ring 9 are coupled firmly to each other. To set the shutter speed according to a desired value, shutter speed adjusting member 1 is rotated until the desired speed ($\frac{1}{60}$ sec. for example, FIG. 1) is aligned with fixed index 11 on the objective barrel. When adjusting member 1 is rotated to the desired speed setting, the index 3 carried thereon travels alongside symbol scale 5. Now, when the symbol corresponding to the prevailing scene brightness is aligned with index 3 by rotating film speed adjusting member 4 relative to the previously set index 3, diaphragm control ring 9 is engaged and also is rotated by virtue of the aforementioned coupling means to set automatically the required $f$ value ($f/4$, for example, FIG. 1). After these operations are performed, the camera is ready for operation.

If use of a film of different speed requires a change in the film speed setting, the linkage between film speed adjusting member 4 and diaphragm control ring 9 is disengaged by depressing control 10. Adjusting member 4 may now be freely rotated relative to diaphragm control ring 9 without the $f$ value changing. When a position is reached in which index 6 is aligned with the desired film speed value (18 DIN for example, in FIG. 2), control 10 is released, and the locked relationship between adjusting member 4 and diaphragm control ring 9 is re-established. The scene brightness symbol used in the above example (FIG. 1), which meanwhile has moved because of rotation of adjusting member 4, now is realigned with index 3 of shutter speed adjusting member 1 if the same scene conditions exist. As may be seen in FIG. 2, the $f$ value now has corrected itself automatically to $f/5.6$ because of the engagement between film speed adjusting member 4 and diaphragm control ring 9.

It readily will be apparent that when scene brightness changes the shutter speed and its index 3 may be rotated to follow up the corresponding scene brightness symbol without changing the $f$ stop. On the other hand, when the photographer wishes to maintain a preset shutter speed, he may rotate the corresponding scene brightness symbol to follow up index 3, thereby changing the $f$ value. Alternatively, if the object to be photographed is extremely bright or dark, both shutter speed adjusting member 1 and adjusting member 4 may be rotated in opposite directions until the shutter speed $f$ stop combination corresponding to the particular scene brightness can be set.

While the invention has been described above in detail with reference to a preferred embodiment, changes therefrom can be resorted without departing from the spirit of the invention or the scope of the sub-joined claims.

I claim:

1. In an objective for a photographic camera having an adjustable shutter mechanism adapted when cocked and released to make film exposures of varying durations depending on the shutter speed setting, and an adjustable diaphragm mechanism to set the diaphragm opening to varying $f$ stop settings, the combination comprising:
    means carrying a shutter speed index,
    a movable shutter speed adjusting member to set the speed of the shutter mechanism and carrying a scale aligned with the shutter speed index to indicate the shutter speed, the shutter adjusting member further carrying a scene index,
    a movable diaphragm adjusting member to set the diaphragm mechanism to a preselected $f$ stop setting, the diaphragm adjusting member carrying a film indicator scale indicating a range of film speed values,
    a movable film speed setting member movable relative to said diaphragm adjusting member and carrying a scale of symbols visually corresponding to scene conditions, the scale cooperating with the scene index on the shutter speed adjusting member, and further carrying a film index cooperating with the film speed indicator scale on the diaphragm adjusting member, and
    coupling means releasably locking together the diaphragm adjusting member and film speed setting member at a predetermined film speed setting, and for simultaneous movement relative to the shutter speed adjusting member to align the scene brightness index with the appropriate scene brightness symbol corresponding to scene conditions.

2. The combination according to claim 1 wherein the diaphragm mechanism has a fixed diaphragm index, and the diaphragm adjusting member further carries a diaphragm scale having $f$ stop indicia cooperable with the fixed diaphragm index to indicate the preselected $f$ stop setting.

3. The combination according to claim 1 wherein the adjusting members and the setting member are mounted coaxially for relative rotation.

4. The combination according to claim 3 wherein the means carrying the fixed shutter index comprises a fixed objective barrel and the adjusting members and the setting member comprise rings rotatably mounted on said barrel.

5. In an objective for a photographic camera having an adjustable shutter mechanism adapted when cocked and released to make film exposures of varying durations depending on the shutter speed setting, and an adjustable diaphragm mechanism to set the diaphragm opening to varying $f$ stop settings, the combination comprising:
    a movable shutter speed adjusting member to set the speed of the shutter mechanism and having indicia to indicate the shutter speed, and separate indicia to indicate scene brightness;
    a movable diaphragm adjusting member to set the diaphragm mechanism to a preselected $f$ stop setting, said diaphragm adjusting member further having indicia to indicate film speed;
    a movable film speed setting member having indicia to indicate scene brightness cooperating with said scene brightness indicia on said shutter speed adjusting member to indicate scene conditions, and said film speed setting member further having separate indicia to indicate film speed; and
    coupling means releasably locking together said diaphragm adjusting member and said film speed setting member at a predetermined film speed setting for simultaneous movement of said diaphragm adjusting member and said film speed setting member relative to the shutter speed adjusting member to align said scene brightness indicias on said film speed setting and shutter speed adjusting members to correspond to the scene condition.

6. The invention according to claim 5 wherein the diaphragm mechanism has a fixed diaphragm index, and the diaphragm adjusting member further has separate indicia cooperable with said fixed index to indicate the $f$ stop settings.

References Cited

UNITED STATES PATENTS

| | | |
|---|---|---|
| 1,623,998 | 4/1927 | Cooke. |
| 2,343,257 | 3/1944 | Hineline. |
| 2,955,519 | 10/1960 | Sommer. |
| 3,067,663 | 12/1962 | Kremp _____ 95—44 |
| 3,107,593 | 10/1963 | Hausmann. |

NORTON ANSHER, Primary Examiner

L. H. McCORMICK, JR., Assistant Examiner

U.S. Cl. X.R.

95—53